US008448158B2

(12) United States Patent
Ito et al.

(10) Patent No.: US 8,448,158 B2
(45) Date of Patent: May 21, 2013

(54) PROGRAM CODE GENERATION SUPPORT DEVICE AND METHOD, PROGRAM EXECUTION DEVICE AND METHOD, AND PROGRAM CODE COMPRESSION PROCESSING DEVICE AND METHOD AND PROGRAM THEREOF

(75) Inventors: Takahiro Ito, Tokyo (JP); Shigeki Suzuki, Tokyo (JP); Yoshiko Ochiai, Tokyo (JP); Noriyuki Kushiro, Tokyo (JP); Yoshiaki Koizumi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 1607 days.

(21) Appl. No.: 11/883,627

(22) PCT Filed: Feb. 2, 2006

(86) PCT No.: PCT/JP2006/301745
§ 371 (c)(1),
(2), (4) Date: Aug. 3, 2007

(87) PCT Pub. No.: WO2006/082878
PCT Pub. Date: Aug. 10, 2006

(65) Prior Publication Data
US 2008/0168431 A1    Jul. 10, 2008

(30) Foreign Application Priority Data

Feb. 3, 2005   (JP) .................................. 2005-028122
Feb. 3, 2005   (JP) .................................. 2005-028123

(51) Int. Cl.
*G06F 9/45*   (2006.01)
(52) U.S. Cl.
USPC ........................... 717/154; 717/143; 717/165
(58) Field of Classification Search
USPC ................................................ 717/140–167
See application file for complete search history.

(56) References Cited

U.S. PATENT DOCUMENTS 5,511,198 A    4/1996  Hotta
5,530,964 A    6/1996  Alpert et al.
(Continued)

FOREIGN PATENT DOCUMENTS

CN    1264254 A    8/2000
CN    1512334      7/2004
(Continued)

OTHER PUBLICATIONS

Uzelac et al., Real-time Unobtrusive Program Execution Trace Compression Using Branch Predictor Events, Oct. 24-29, 2010, Scottsdale, Arizona, USA., Copyright 2010 ACM, pp. 97-106.*

(Continued)

*Primary Examiner* — Wei Zhen
*Assistant Examiner* — Satish Rampuria
(74) *Attorney, Agent, or Firm* — Buchanan Ingersoll & Rooney PC

(57) ABSTRACT

To obtain a program code generation support device, method, and the like, capable of generating a new program code, in particular, generating in accordance with an incorporating apparatus, by performing a further optimization on a program code.

The device includes storage means 6 for storing as data, an optimization rule that is composed of a conversion condition for converting data of a program code and a conversion content thereof, and code optimization means 4 that includes a code analysis unit 4A for analyzing the program code, a condition search unit 4B for search a part matching the conversion condition in the program code through a collation with the optimization rule stored in the storage means on the basis of the analyzed program code, and an optimization unit 4C for generating data of a new program code by converting the part matching the conversion condition on the basis of the conversion content.

8 Claims, 9 Drawing Sheets

U.S. PATENT DOCUMENTS

| | | | |
|---|---|---|---|
| 5,586,020 A | 12/1996 | Isozaki | |
| 6,028,987 A * | 2/2000 | Hirairi | 716/103 |
| 6,064,819 A | 5/2000 | Franssen et al. | |
| 6,071,317 A * | 6/2000 | Nagel | 717/128 |
| 6,078,745 A | 6/2000 | De Greef et al. | |
| 6,216,213 B1 * | 4/2001 | Breternitz et al. | 711/170 |
| 6,499,096 B1 * | 12/2002 | Suzuki | 712/24 |
| 6,516,305 B1 * | 2/2003 | Fraser | 706/8 |
| 6,747,554 B1 | 6/2004 | Higashimura et al. | |
| 7,181,735 B1 | 2/2007 | Haraguchi et al. | |
| 2002/0059567 A1 * | 5/2002 | Minamide et al. | 717/151 |
| 2004/0210882 A1 | 10/2004 | Takeuchi | |

FOREIGN PATENT DOCUMENTS

| | | |
|---|---|---|
| JP | 139646/1988 | 9/1988 |
| JP | 4-130541 A | 5/1992 |
| JP | 7-21032 A | 1/1995 |
| JP | 9-016382 A | 1/1997 |
| JP | 10-320172 | 12/1998 |
| JP | 2000-20318 A | 1/2000 |
| JP | 2001-125792 | 5/2001 |
| JP | 2002-318696 A | 10/2002 |
| JP | 2003-157170 A | 5/2003 |

OTHER PUBLICATIONS

Breternitz, M., Jr.; Smith, R.; Enhanced compression techniques to simplify program decompression and execution, Computer Design: VLSI in Computers and Processors, IEEE International Conference on Oct. 12-15, 1997, pp. 170-176.*

Tanenbaum et al., "A Practical Tool Kit for Making Portable Compilers" Communications of the Association for Computing Machinery, ACM, New York, NY, US, 1983, vol. 26, No. 9, pp. 654-660.*

European Search Report issued in corresponding Application No. 09014774.5-1243 dated Jan. 15, 2010.

Hayes et al., "An Architecture for the Direct Execution of the Forth Programming Language" Asplos. Proceedings. International Conference on Architecturalsupport for Programming Languages and Operating Systems, New York, NY, US, 1987, pp. 42-49, XP008058727.

Tanenbaum et al., "A Practical Tool Kit for Making Portable Compilers" Communications of the Association for Computing Machinery, ACM, New York, NY, US, 1983, vol. 26, No. 9, pp. 654-660, XP002026989.

Supplementary European Search Report in corresponding Application No. 06712888.4 dated Feb. 10, 2009.

U.S. Appl. No. 10/529,869, Toshiyasu Higuma, filed Oct. 4, 2005.

Nobuyuki Hikichi et al., "Compiler for Embedded System", IEICE Technical Report (CPSY98-9), Apr. 23, 1998, vol. 98, No. 24, pp. 63-70.

International Search Report.

Search Report dated May 6, 2011, issued in the corresponding European Patent Application No. 10014002.9-1243.

Notification of Reason(s) for Refusal dated Sep. 21, 2010, issued in the corresponding Japanese Patent Application No. 2005-028122, and an English Translation thereof.

Notification of Reason(s) for Refusal dated Sep. 21, 2010, issued in the corresponding Japanese Patent Application No. 2005-028123, and an English Translation thereof.

Official Action issued by the Chinese Patent Office on Jan. 31, 2012 in corresponding Chinese Patent Application No. 200810184954.7, and partial English language translation of the Official Action.

Office Action from the Chinese Patent Office dated Aug. 13, 2012, issued in corresponding Chinese Patent Application No. 200810184954.7 with an English translation thereof.

U.S. Office Action dated Nov. 23, 2012, issued in related U.S. Appl. No. 13/195,073, pp. 1-20.

Cooper et al., "Optimizing for Reduced Code Space Using Genetic Algorithms," 1999 ACM, pp. 1-9.

Fraser et al., "Automatic Generation of Fast Optimizing Code Generators," 1988 ACM, pp. 79-84.

Piumarta et al., "Optimizing Direct Threaded Code by Selective Inlining," 1998 ACM, pp. 291-300.

Office Action from Chinese Patent Office dated Feb. 22, 2013, issued in corresponding Chinese Patent Application No. 200810184954.7, with a partial English translation thereof, pp. 1-4.

* cited by examiner

FIG. 2

```
ECHONET PROPERTY REGISTRATION

APPLIANCE  [HOUSEHOLD       ▽]
               [AIR CONDITIONER   ]

STATE CHANGE
                                          ANNOUNCEMENT
                                          AVAILABILITY OR
    ECHONET PROPERTY    TYPE    ACCESS RULE  NONAVAILABILITY  SIZE

[OPERATIVE STATE ▽] [unsigined char ▽] [Set/Get ▽] [AVAILABLE ▽] [1]

[OPERATION MODE  ▽] [unsigined char ▽] [Set/Get ▽] [AVAILABLE ▽] [1]

[TEMPERATURE SET ▽] [unsigined char ▽] [Set/Get ▽] [AVAILABLE ▽] [1]
     VALUE

[AIR VOLUME SETTING ▽] [unsigined char ▽] [Set/Get ▽] [AVAILABLE ▽] [1]
                                ⋮
```

FIG. 3

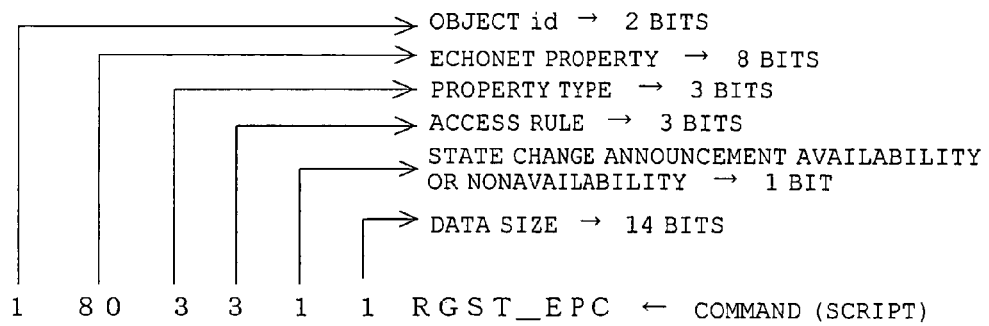

```
                          ┌─> OBJECT id         → 2 BITS
                          │┌─> ECHONET PROPERTY → 8 BITS
                          ││┌─> PROPERTY TYPE   → 3 BITS
                          │││┌─> ACCESS RULE    → 3 BITS
                          ││││┌─> STATE CHANGE ANNOUNCEMENT AVAILABILITY
                          │││││   OR NONAVAILABILITY → 1 BIT
                          │││││┌─> DATA SIZE    → 14 BITS
                          ││││││
    1   80   3  3  1  1  R G S T _ E P C   ← COMMAND (SCRIPT)
```

| CODE STORAGE CAPACITY | ☐ M B |
| USABLE RAM CAPACITY | ☐ M B |
| BINARY COMPRESSION | ●YES ○NO |
| OUTPUT MEDIUM ELECTRICAL | ○STORAGE MEDIUM ●PRINT MEDIUM |
| CONVERSION TO QR CODE | ●YES ○NO |

FIG. 11
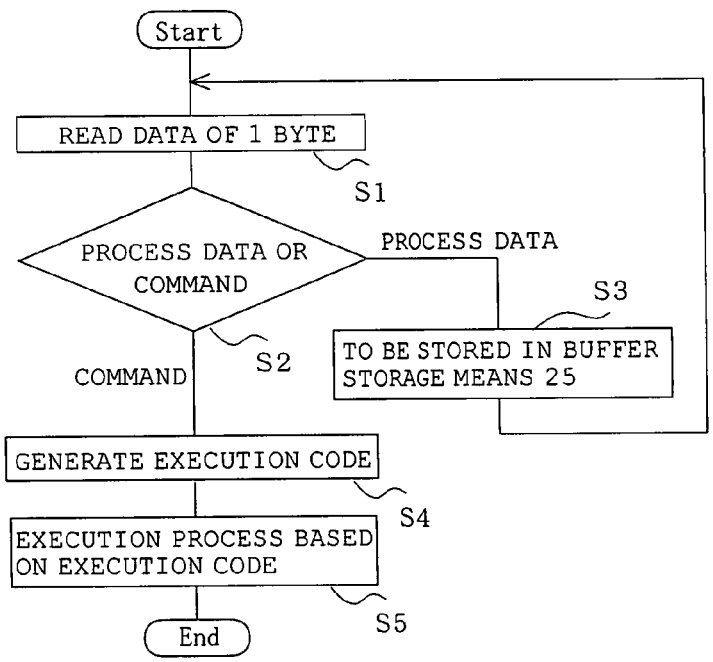
FIG. 12
(a)
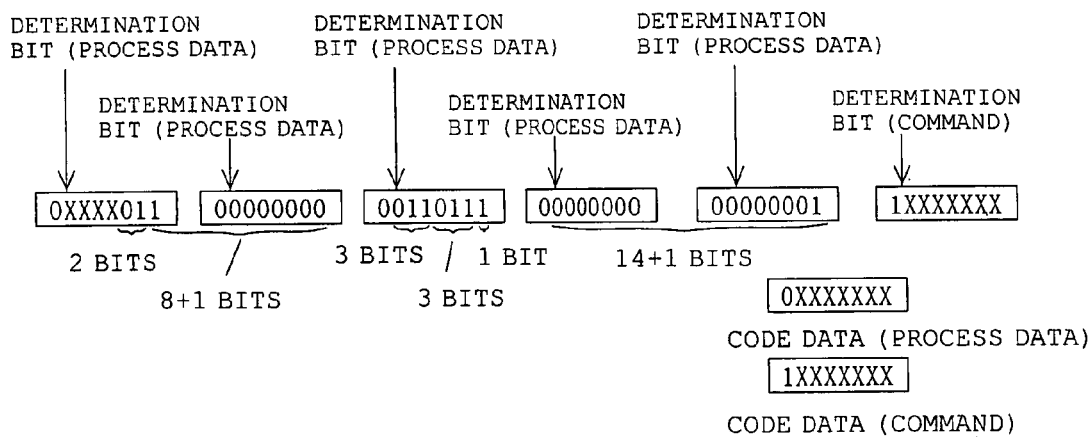
(b)
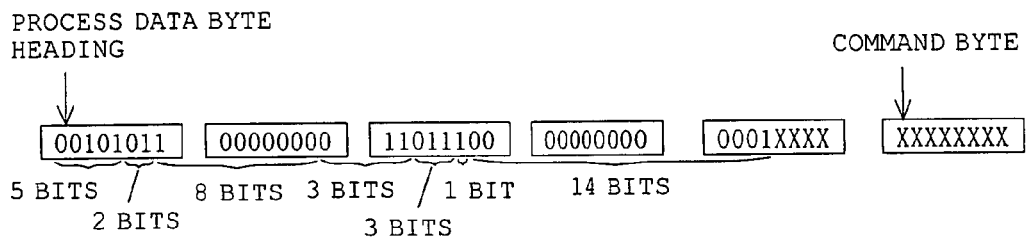

PROGRAM CODE GENERATION SUPPORT DEVICE AND METHOD, PROGRAM EXECUTION DEVICE AND METHOD, AND PROGRAM CODE COMPRESSION PROCESSING DEVICE AND METHOD AND PROGRAM THEREOF

TECHNICAL FIELD

The present invention relates to a program code generation support device for performing a support for generating a program code and the like. In particular, the device is for optimizing a program code in accordance with a device or the like which executes and processes the program code. Also, the invention relates to a program execution device, method, and the like, for performing an execution process on the basis of a program code. In addition, the invention relates to a program code compression processing method and device for realizing the device and the method.

BACKGROUND ART

In a household electrical appliance (an air conditioner, a refrigerator, a washing machine, a luminescent lamp lighting device, or the like), etc., to control an operation thereof, a program execution device is incorporated (hereinafter such a household electrical appliance, a household electrical appliance adapter, or the like is referred to as an incorporating apparatus). At this time, in order that the program execution device performs an execution process, predetermined data that is called a program code is required. This program code is, for example, stored in advance in storage means such as a ROM (Read Only Memory) which is provided in the incorporating apparatus, and the program execution device reads (inputs) the program code stored in the ROM to perform the execution process. Then, a device for supporting a generation of such a program code is also proposed (for example, refer to Patent Document 1).

In addition, there is a program execution device for performing a compression process of the program code to reduce the amount of data that should be stored and to reduce a storage capacity of the storage means such as the ROM as much as possible, thus suppressing costs related to the storage means (for example, refer to Patent Document 2). In this manner, the reduction in the data amount of the program code will be, in the days to come, convenient for a case where the incorporating apparatuses are mutually connected via a network to send and receive, for example, signals containing data of the program code.

Patent Document 1: Japanese Unexamined Patent Application Publication No. 9-16382
Patent Document 2: Japanese Unexamined Patent Application Publication No. 2002-318696.

DISCLOSURE OF INVENTION

Problems to be Solved by the Invention

Herein, environments where the program code is used are not necessarily uniform and largely vary depending on, for example, the incorporating apparatus (in particular, the program execution device). Thus, it is desired to generate a program code in accordance with a characteristic of the incorporating apparatus or the like. In particular, if the data amount related to the program code can be set small, by just that much, it is possible to reduce a storage capacity of the ROM or a buffer for temporal storage at the time of performing the execution process in the program execution device. Also, in the days to come, such a reduction is also convenient to a case where the incorporating apparatuses are mutually connected via the network to send and receive, for example, signals containing the program code. However, the support device described above merely generates the program code.

Also, in usual cases, when the program code is compressed, an execution process speed of the program execution device is decreased. In view of the above, a method of accumulating an expanded program code in temporal storage means (buffer) that is composed of a RAM (Randam Access Memory) or the like is adopted. For that reason, a large RAM capacity is required.

In view of the above, an object of the present invention is to realize a program code generation support device, method, and the like, capable of further optimizing a program code to generate a new program code, in particular, a program code generation support device, method, and the like, capable of generating a program code in accordance with an incorporating apparatus. Furthermore, an object of the present invention is to obtain a program execution device, method, and the like, capable of reducing a storage capacity of a buffer that should be prepared while reduction in a storage capacity of a ROM is achieved with use of a compressed program code and also decrease in an execution process speed of the program execution device is avoided. In addition, an object of the present invention is to realize a program code compression method, device, and the like, for realizing the afore-mentioned device and method.

Means for Solving the Problems

A program code generation support device according to the present invention includes storage means for storing as data an optimization rule that is composed of a conversion condition for converting data of a program code and a conversion content; and code optimization means that includes a code analysis unit for analyzing the program code, a condition search unit for performing a collation on the basis of the analyzed program code with respect to the optimization rule stored in the storage means to search for a part matching the conversion condition in the program code, and an optimization unit for converting the part matching the conversion condition on the basis of the conversion content to generate data of a new program code.

In addition, a program execution device according to the present invention includes first storage means for storing data obtained by compressing a program code constituted by an execution code that is composed of process data used for an execution process and a command representing the execution process which are arranged in order; second storage means for temporarily storing the process data; type determination means for reading data of the compressed program code from the first storage means by a predetermined data amount to determine whether or not the data contains the command, and storing the process data in the data in the second storage means, in the case when it is determined the data does not contain the command; code extension means for generating an execution code on the basis of the process data stored in the second storage means and the command, in the case when the type determination means determines that the data contains the command; and execution means for sequentially performing the execution process of the program code on the basis of the execution code generated by the code extension means.

Effects of the Invention

According to the present invention, with respect to the program code, further in the code optimization means, the code analysis unit performs the analysis, the condition search unit searches for the part matching the condition on the basis of the optimization rule, and the optimization unit performs the conversion for performing the optimization to further generate the new execution code (program code). Thereby, the optimization can be achieved such that the program execution device which the incorporating apparatus has easily performs the execution process or the like. In particular, the execution codes continued on the basis of the same command are compiled to generate the new execution code, and it is therefore possible to reduce the data amount of the entire program code. Also, in the execution process as well, it is possible to increase the process speed as the processes are collectively performed at once.

Moreover, according to the present invention, the data obtained by compressing (encoding) the program code is read from the first storage means by a predetermined amount of data. When the code type determination means determines that the data does not contain the command, the second storage means is caused to temporarily store the process data. When it is determined as the command, the code extension means generates the execution code on the basis of the process data and the command, and the execution means performs the execution process based on the execution code. Thereby, it suffices that the second storage means merely stores the process data until the execution code is generated, thus making it possible to decrease the storage capacity that should be provided to the second storage means. Furthermore, as the entire process of the program execution device from the reading of the data from the first storage means to the execution process of the execution code is simple, the decrease in the speed can be avoided even without keeping the thus generated execution code (program code).

BRIEF DESCRIPTION OF THE DRAWINGS

[FIG. 2] A diagram illustrating an example of a screen which specification input means 1 displays on display means 20.
[FIG. 3] A diagram illustrating an example of an execution code.
[FIG. 11] A flowchart describing operations in the program execution device.
[FIG. 12] Diagrams illustrating a compressed execution code according to Embodiment 3.

Figure 1:
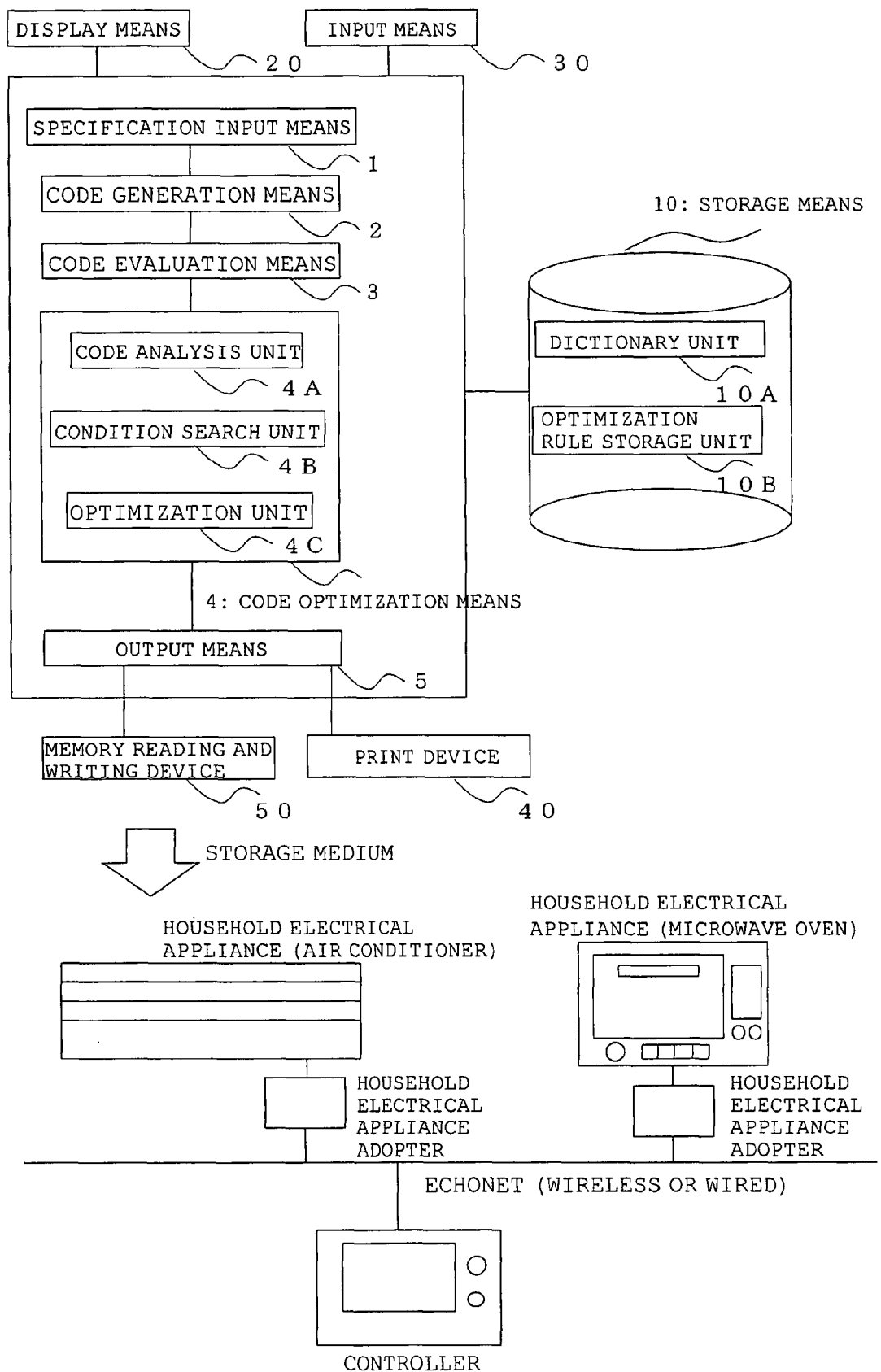
[FIG. 1] A diagram illustrating a system around a program code generation support device.

REFERENCE NUMERALS 1 specification input means, 2 code generation means, 3 code evaluation means, 4, 4-1 code optimization means, 4A code analysis unit, 4B condition search unit, 4C, 4D optimization unit, 4E process data and command discrimination unit, 4F conversion unit, 5 output means, 6 incorporating apparatus condition input means, 10 storage means, 10A dictionary unit, 10B optimization rule storage unit, 20 display means, 30 input means, 40 print device, 50 memory reading and writing device, 101 control process means, 101A process data and command discrimination unit, 101B conversion unit, 102 storage means, 103 communication means, 121 code type determination means, 122 code extension means, 123 execution means, 124 program code storage means, 125 buffer storage-means.

BEST MODE FOR CARRYING OUT THE INVENTION

Embodiment 1

FIG. 1 is a diagram illustrating a system around a program code generation support device according to Embodiment 1 of the present invention. The program code generation support device is composed of specification input means 1, code generation means 2, code evaluation means 3, code optimization means 4, output means 5, storage means 10, display means 20, and input means 30.

FIG. 2 is a diagram illustrating an example of a screen which the specification input means 1 displays on display means 20. The specification input means 1 displays, for example, a screen which allow an operator to input a specification on the display means 20, and processes data that is input from the input means 30 as the specification. The data thus processed becomes process data which constitutes an execution code. At this time, ECHONET (Energy Conservation and Homecare Network: ECHONET is a trademark of ECHONET consortium) refers to a standard of a network (communication circuit) for performing a control while making household electrical appliances cooperated with one another as shown in FIG. 1. According to this embodiment, a program code for performing an execution process in appliances, adapters, and the like, which are connected on the basis of the standard, is generated. A relation between elements (items) of each specification and process data will be described later.

FIG. 3 is a diagram illustrating an example of an execution code. The code generation means 2 generates a program code on the basis of the data processed by the specification input means 1. In FIG. 3, it is described as text data. The program code is composed of one or a plurality of execution codes. The execution code is a unit in which execution processes are sequentially performed, for example, by an interpreter of a program execution device which the incorporating apparatus includes. In this embodiment, Forth is used as a language which is used for the program code. Forth is a language based on a reverse Polish notation where syntax analysis is simple or unnecessary. According to this embodiment, the execution code is composed of data of a command (instruction) representing a process that the program execution device should execute (hereinafter referred to as command; In Forth, referred to as word) and data for a process based on the command (hereinafter referred to as process data), and is described in the order of the process data and the command. At this time, each command and data of its process content is previously defined (associated) and registered (which is called dictionary). For that reason, if the data such as a character string described in the execution code is registered in the dictionary, the data is a command, and if the data is not registered, the data is a process data. Also, in addition to the commands previously determined, a process content of the command can be registered in the dictionary by defining the command process content. According to this embodiment, this dictionary is stored in the storage means 10 as a dictionary unit 10A. In this case, the program code is generated with use of Forth, but the program code to which the present invention can be applied is not limited to the above.

Here, the code generation means 2 generates a program code for evaluation so that the operator can easily performs an evaluation when the program code is displayed on the display means 20 in a process by a code evaluation support means 3 in a later stage. For example, the generation is performed so that the character string of the execution code is not too long, or a basic command, which is not uniquely defined, is used for the generation, thus facilitating a tracing.

Command RGST_EPC is described for executing and processing a registration for property information of the incorporating apparatus. Object id (obj_id) is an id added to an object of the incorporating apparatus. ECHONET property (epc) is a code of a property (for example, an air volume setting state in an air conditioner or the like), which can be set in accordance with the incorporating apparatus. A value of the code is defined by the ECHONET standard. Also, 7 types are prepared for data types (type) of the property (automatically determined when the incorporating apparatus and the property are determined). Access rule (rule) represents write, read, and allowance or disallowance of notification. State change announcement availability or nonavailability (anno) is an index (flag) indicating whether or not, when a state of the property is changed, a notification is issued via the network. Data size (size) is for defining a data size of the property, and the maximum value of the size is set as 8640 bytes in the ECHONET standard.

The code evaluation means 3 performs a support for the operator to evaluate the program code (the execution code) that is generated by the code generation means 2 or other means. For example, in order that the operator evaluates the program code through check, debag, or the like of the thus generated program code, the program code is displayed on the screen of the display means 20. In addition, the program execution device has an interpreter used when performing the execution process, thus making it possible to perform the execution process of the thus generated execution code. As a result, the operator can check the execution process that is performed on the basis of the program code (the execution code).

The code optimization means 4 optimizes the program code on the basis of the optimization rule stored in an optimization rule storage unit 10B of the storage means 10. The code optimization means 4 is composed of a code analysis unit 4A, a condition search unit 4B, and an optimization unit 4C. The optimization rule is generated, for example, by setting a conversion rule into data in order that the program execution device can effectively perform the execution process on the basis of the program code, by way of compiling a plurality of execution codes, generating a new execution code, etc. The optimization rule will be further described later.

The code analysis unit 4A analyzes the input program code. Herein, the code analysis unit 4A has a counter to count the consecutive number of the execution codes in a part where the execution codes having the same command for executing and processing the same content consecutively appear. The condition search unit 4B performs a search based on the conversion condition. That is, it is determined as to whether or not there is a part matching the conversion condition by collating the analyzed program code with the conversion condition constituting the optimization rule. At that time, the count of the code analysis unit 4A is referred to. The optimization unit 4C generates a new execution code (eventually, a program code) with regard to the part determined by the condition search unit 4B to match the conversion condition.

At this time, the code analysis unit 4A, the condition search unit 4B, and the optimization unit 4C may be composed as physically independent means, but herein, for example, the processes of the respective units are realized while the processes of the respective means are executed by a CPU-based control processing device. It should be noted that the same applies to the relation among the specification input means 1, the code generation means 2, the code evaluation means 3, the code optimization means 4, and the output means 5, and the respective means may be independent from one another. However, according to this embodiment, as the control processing device executes the processes of the respective means, the processes of the program code generation support device are realized.

The output means 5 converts the program code into data of a format in accordance with the corresponding output device and performs a process for causing the output device to output. For example, in a case where the output device is a print device 40, the program code is converted into data that is printed by the print device in a form of a barcode, QR code (a two dimensional code: QR code is a registered trademark of DENSO WAVE INCORPORATED), or the like, and a process is performed for printing the data on a print medium. For that reason, for example, without sending a signal by providing an expensive communication device which is for the exclusive use in the incorporating apparatus and directly connecting to the communication device, it is possible to store the program code by sending a signal including the data to the incorporating apparatus with use of a camera, which is provided to a mobile phone, an infrared communication technology, or the like. As a result, even when a low price medium such as a paper medium is used, the program code stored in the incorporating apparatus can be kept up to date. In addition, for example, a memory reading and writing device 50 may be used as the output device to perform data exchange through an electronic storage medium. Also, the communication device may function as the output device. It should be noted that the storage means 10 stores, in addition to the dictionary stored in the dictionary unit 10A and the optimization rule stored in the optimization rule storage unit 10B, programs and the like for the program code generation support to be performed by the respective means, such as data for displaying a screen on the display means 20.

Figure 4:
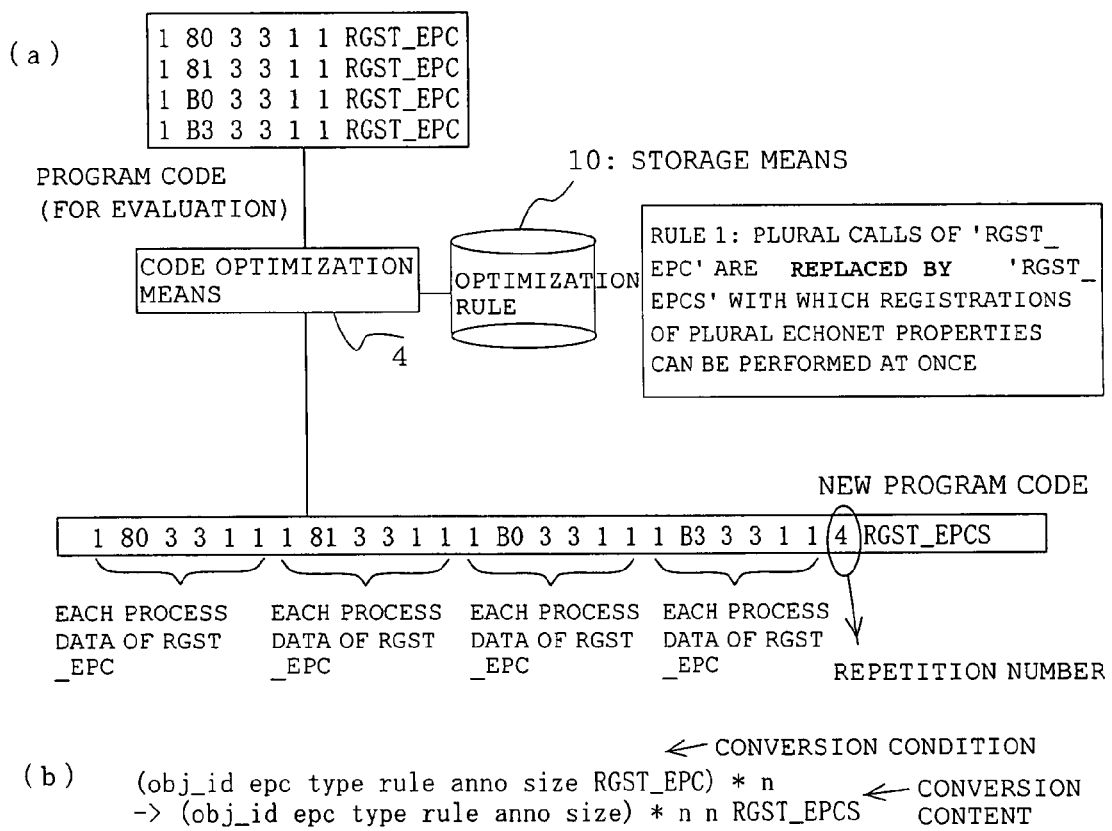
[FIG. 4] Diagrams illustrating an example of an optimization rule.

FIG. 4 are diagrams illustrating an example of an optimization rule. For example, as shown in FIG. 4(*a*), the optimization rule storage unit 10B stores a rule as the optimization rule 'if a description of the program code is made to continuously perform the execution process of command RGST_EPC (registration of an ECHONET property is the process content) by plural times, the command is substituted into command RGST_EPCS with the process contents in which the registrations of a plurality of ECHONET properties are executed and processed at one time'. FIG. 4(*b*) illustrates the contents as data in a script (description) format. A content before an arrow represents a conversion condition at the time when the condition search unit 4B performs a search, and a content after the arrow represents a conversion contents at the time when the optimization unit 4C performs a conversion (herein, n is equal to or larger than 2 as the process is performed by plural times. This n is counted by the code analysis unit 4A). In an execution code related to command RGST_EPCS, with regard to an ECHONET property to be registered, the process data is made by arranging sets of object id (obj_id), ECHONET property (epc), data type (type), state change announcement availability or nonavailability (anno) and data size (size) by the number of repeated registrations and allocating the number of the repetitions. This command RGST_EPCS is also registered in the dictionary unit 10A. In this way, the execution codes are compiled into another execution code to reduce the data amount of the program code, thus achieving the optimization. The execution process is performed while a plurality of execution codes are compiled, whereby it is possible to increase the process speed.

Figure 5:
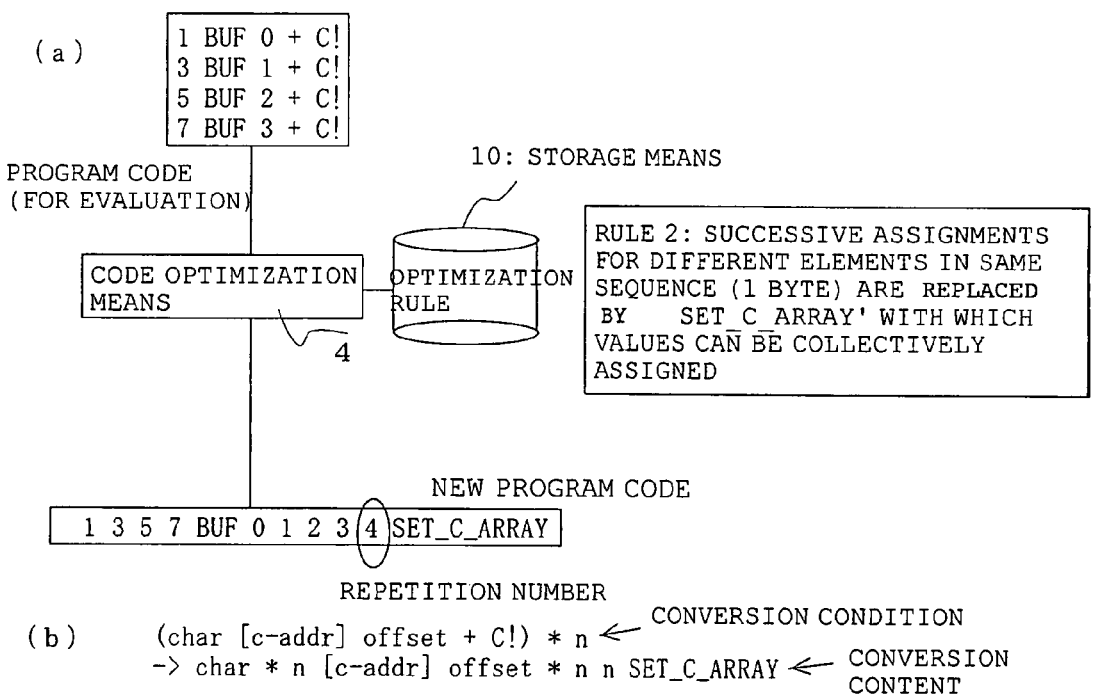
[FIG. 5] Diagrams illustrating another example of the optimization rule.

FIG. 5 are diagrams illustrating another example of the optimization rule. For example, in FIG. 5, a rule 'a consecution of assignments with respect to different elements in the same sequence is substituted into command SET_C_ARRAY where values can be collectively assigned' is stored in the optimization rule storage unit 10B as the optimization rule. FIG. 5(b) illustrates the content as data in a script (description) format. Herein, char represents an assigned value, c-addr represents an address of the assigned part, and offset represents an offset from the initial address. [ ] that is added to c-addr of the conversion condition at the time when the condition search unit 4B performs a search and the conversion content at the time when the optimization unit 4C performs a conversion represents that the contents of c-addr (character strings) are the same. In addition, n is equal to or larger than 2 and is counted by the code analysis unit 4A. For example, '1 BUF 0+C!' is an execution process for assigning 1 at a part at the 0th byte from address BUF. In an execution code related to command SET_C_ARRAY, the process data is made by arranging assigned values (char) by n times (the number of repetitions), arranging 'BUF' representing an address and an offset by n times, and allocating the number of the repetitions. Also, command SET_C_ARRAY is registered in the dictionary unit 10A.

As described above, according to Embodiment 1, the code analysis unit 4A performs the analysis on the program code generated by the code generation means 2 further in the code optimization means 4, the condition search unit 4B searches for the part matching the conversion condition on the basis of the optimization rule stored in the optimization rule storage unit 10B, and the optimization unit 4C performs a conversion for performing the optimization for the part matching the conversion condition which is determined by the condition search unit 4B to generate the new execution code (the program code). Thus, the program execution device which the incorporating apparatus has can perform the optimization to facilitate the execution process or the like. In particular, the part where the execution codes based on the same command consecutively appear is compiled to generate the new execution code, and as the data amount of the entire program code can be reduced and the processes can be collectively performed at once in the execution process as well, it is possible to increase the process speed. At that time, the program code related to the generation by the code generation means 2 is generated in such a manner that the operator easily performs the evaluation when the code evaluation support means 3 displays the program code on the display means 20, whereby the operator can easily perform the check, correction, and the like. Furthermore, the program code is converted into the data in accordance with the output device by the output means 5, and therefore it is possible to record the program codes corresponding to various formats of the output devices. In particular, if the conversion is made into the data for printing the barcode, QR code, or the like for printing, the record of the program code can be performed on the low price medium. Also, for example, general communication means such as a mobile phone can be used for sending the signal including the program code to the incorporating apparatus.

Embodiment 2

Figure 6:
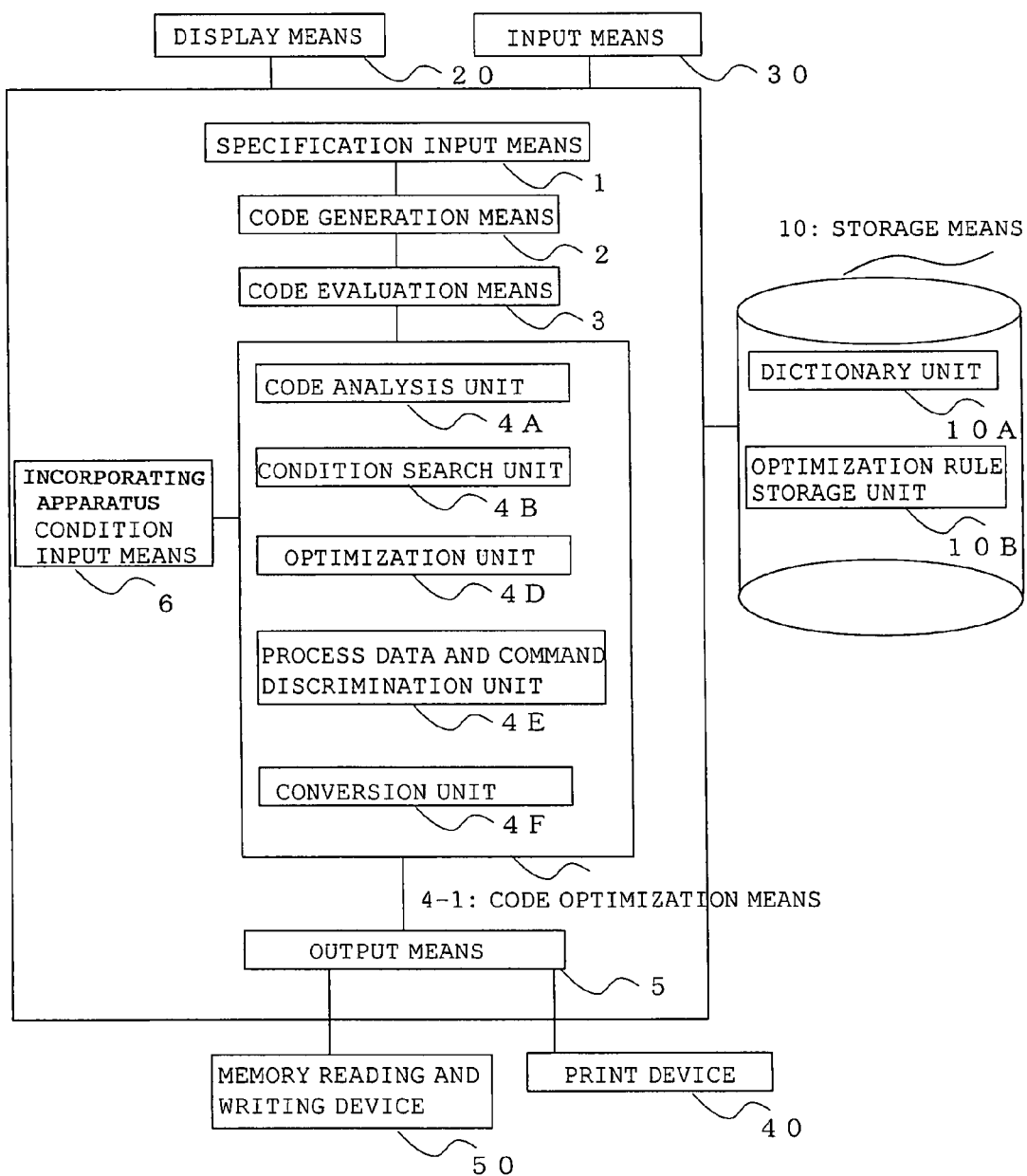
[FIG. 6] A diagram illustrating a program code generation support device according to Embodiment 2.

FIG. 6 is a drawing illustrating a program code generation support device according to Embodiment 2 of the present invention. The environment where the program code is held (stored) in the incorporating apparatus and the environment where the program execution device which the incorporating apparatus has performs the execution process on the basis of the program code vary depending on a type of the device. In particular, for the program code generation, a storage capacity of a ROM for holding (storing) the program code and a usable storage capacity of a RAM (Random Access Memory) during the execution process or the like. In view of the above, according to this embodiment, a condition for the incorporating apparatus (an execution process environment based on the program code) is set and reflected at the time of the program code generation. In FIG. 6, a part having the same reference numeral as that of the program code generation support device of FIG. 1 performs a similar process operation to that of the means described in Embodiment 1, so that its explanation is omitted.

Figures 7, 8:
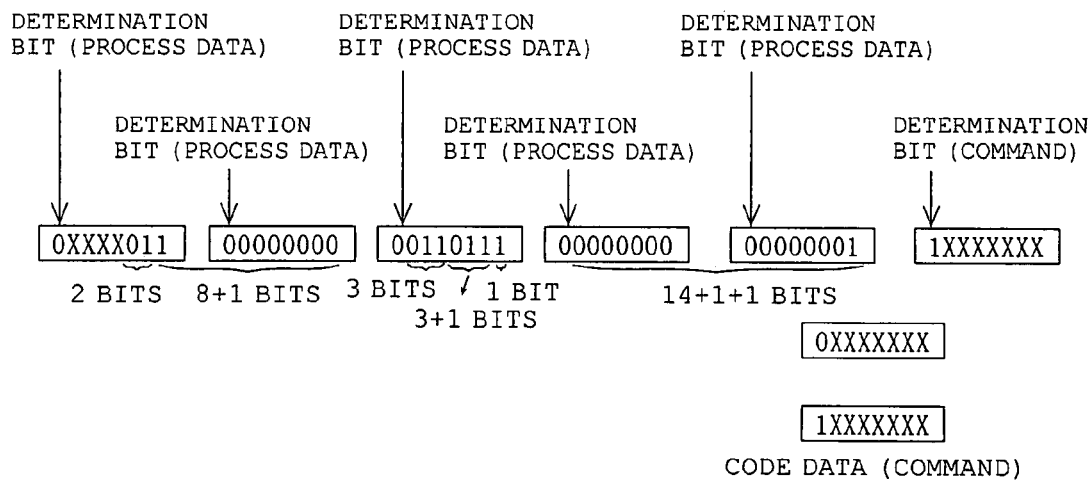
[FIG. 7] A diagram illustrating an example of a screen which incorporating apparatus condition input means 6 displays.
[FIG. 8] A diagram illustrating compressed execution data.

FIG. 7 is a drawing illustrating an example of a screen which incorporating apparatus condition input means 6 displays on the display means 20. The incorporating apparatus condition input means 6 displays, for example, a screen which allows an operator to input a characteristic, a condition, and the like of the incorporating apparatus on the display means 20. The incorporating apparatus condition input means performs a setting process of an instruction signal that is input from the input means 30 and transmits the signal to the code optimization means 4 and the output means 5. In FIG. 7, it is possible to set the storage capacity of the ROM for holding the program code (code storage capacity), the usable storage capacity of the RAM (usable RAM capacity), whether or not the compression process of the program code is performed (binary compression), whether the program code is output as the print medium or is output as the electronic storage medium such as a memory card (output medium), and whether or not when the print medium is selected, the conversion into QR code (QR code is a registered trademark of DENSO WAVE INCORPORATED) is performed (conversion into QR code).

Code optimization means 4-1 according to this embodiment is different from the optimization means 4 in that the code optimization means 4-1 is provided with a optimization unit 4D for performing, in addition to the process of the optimization unit 4C, a determination on the basis of the storage capacities of the ROM and the RAM of the incorporating apparatus which are input in the incorporating apparatus condition input means 6, instead of the optimization unit 4C. Also, another difference resides in that a process data and command discrimination unit 4E and a conversion unit 4F for compressing the program code are provided. According to this embodiment, the process data and command discrimination unit 4E and the conversion unit 4F are constituted as a part of functions of the code optimization means 4-1, but may be constituted as independent program code compression process means.

The optimization unit 4D performs a conversion for performing the optimization for the part matching the conversion condition, which is determined by the condition search unit 4B, to generate a new execution code, but at that time, if the number of execution codes to be complied becomes large, the data amount of the process data becomes large, and there is a possibility that the data amount of a new execution code becomes large. For that reason, depending on an incorporating apparatus, when the program execution device performs the execution process, the data amount may exceed the capacity of the RAM for temporality storing the execution codes and the like. In view of the above, on the basis of the data about the usable RAM capacity that is input via the incorporating apparatus condition input means 6, when it is determined that the data amount exceeds the capacity, the optimization unit 4D generates a plurality of execution codes whose data amount is equal to or smaller than the capacity, separately. Also, when the data amount of the entire program code exceeds the storage capacity of the ROM for holding the program code which the incorporating apparatus has, irrespective of the presence or absence of the setting, the process data and command discrimination unit 4E and the conversion unit 4F are caused to perform the compression process. The above-described determination and the like are performed to generate a new program code.

FIG. 8 is a diagram illustrating compressed execution data. Next, the compression process will be described on the basis of the execution code which is described in FIG. 3. On the basis of the input of the binary compression in the incorporating apparatus condition input means 6 and the determination in the optimization unit 4D, when the compression process is performed, in the data and command discrimination unit 4E, a discrimination process is performed for process data and commands in such a manner that the respective execution codes of the program code are collated with the dictionary stored in the dictionary unit 10A to set character strings, numerals, and the like, which do not match the dictionary, as the process data and to set the matching character strings (scripts) as the commands.

The conversion unit 4F respectively represents the process data and the commands in binary data. At this time, 2 bits for representing object id, 8 bits for ECHONET property (epc), 3 bits for property data type, 3 bits for access rule, 1 bit for state change announcement availability or nonavailability, and 14 bits for data size are allocated. After represented as the binary data, data is generated while being divided for each predetermined data amount. In this embodiment, 7 bits are set as the predetermined data amount. For example, when the process data has data amount that cannot be divided by 7, for example, "0" is replenished for the rest of the bits. Then, for data representing the process data (hereinafter this data is also referred to as process data), "0" is added as an initial bit to the divided bits, and for data for determining the command (hereinafter this data is also referred to as command), "1" is added. That is, this becomes a determination bit (flag) for determining whether this is the process data or the command. As a result each of the execution codes (the program code) is divided into byte code in unit of 1 byte (8 bits). In this way, pieces of the process data divided into the character string of each item (element) are compiled and processed as the binary data to realize the reduction in the data amount.

On the other hand, the command is represented by the binary data corresponding to the command with a 1 to 1 correspondence. As a result, the command represented by the binary data can be determined. A relation between this command and the binary data is associated and stored as data in the storage means 10, and the conversion unit 4F refers to the data at the time of the generation. Herein, if the number of commands is equal to or smaller than 128, 1 byte is enough to determine the command. For example, in a case where the number of commands is equal to or larger than that or the like, 2 or larger bytes are necessary. However, even in such a case, if it becomes possible to determine the command frequently used for (appearing in) the execution process (for example, related to the property, etc.) by way of only 1 byte code data, the data amount of the entire program code can be further reduced. It should be noted that the code data in the byte unit which is generated through the method of this embodiment may be further compressed through a known bit sequence compression method such as a run length method.

Also, on the basis of the data of the output medium that is input via the incorporating apparatus condition input means 6, the output means 5 determines a method for performing the conversion to perform the conversion. At that time, when the electronic storage medium is selected as the output medium, the conversion to QR code is automatically selected as 'not to be performed'. Then, when the print medium is selected as the output medium, the conversion to QR code is selected as 'to be performed'.

In the program execution device which the incorporating apparatus has, via the storage medium or the like, for example, a ROM program code is held. The program code is read by 1 byte, it is determined whether the code is the data containing the command or the data containing the process data on the basis of the determination bit, and in the case of the data containing the process data, the data is temporarily stored in the RAM. When it is determined as the data containing the command, the data is extended to the execution code to perform the execution process.

As described above, according to Embodiment 2, with the provision of the incorporating apparatus condition input means 6 for performing the input setting of the program code of the execution process environment (the capacity of the ROM, the RAM, or the like) of the incorporating apparatus (the program execution device which the incorporating apparatus has), on the basis of the setting, the optimization unit 4D further generates the new program code, whereby it is possible to perform the detailed program code generation in accordance with the characteristic, the condition, and the like of the incorporating apparatus. Then, with the provision of the process data and command discrimination unit 4E and the conversion unit 4F, the compression process of the program code can be performed, whereby the reduction in the storage capacity of the ROM can be achieved, and lower costs can be achieved. Then, in the compression process, the process data and the command are discriminated from each other in each of the execution codes to divide the respective data into 7 bits such that pieces of the process data are compiled in terms of each element (item) into the binary data and for the commands, corresponding numeral numbers are set as the binary data, and the determination bit for determining whether the data contains the process data or the command is added to each data so as to divide the data into 1 byte data each, whereby both the process data and the commands can be compressed.

Embodiment 3

Figure 9:
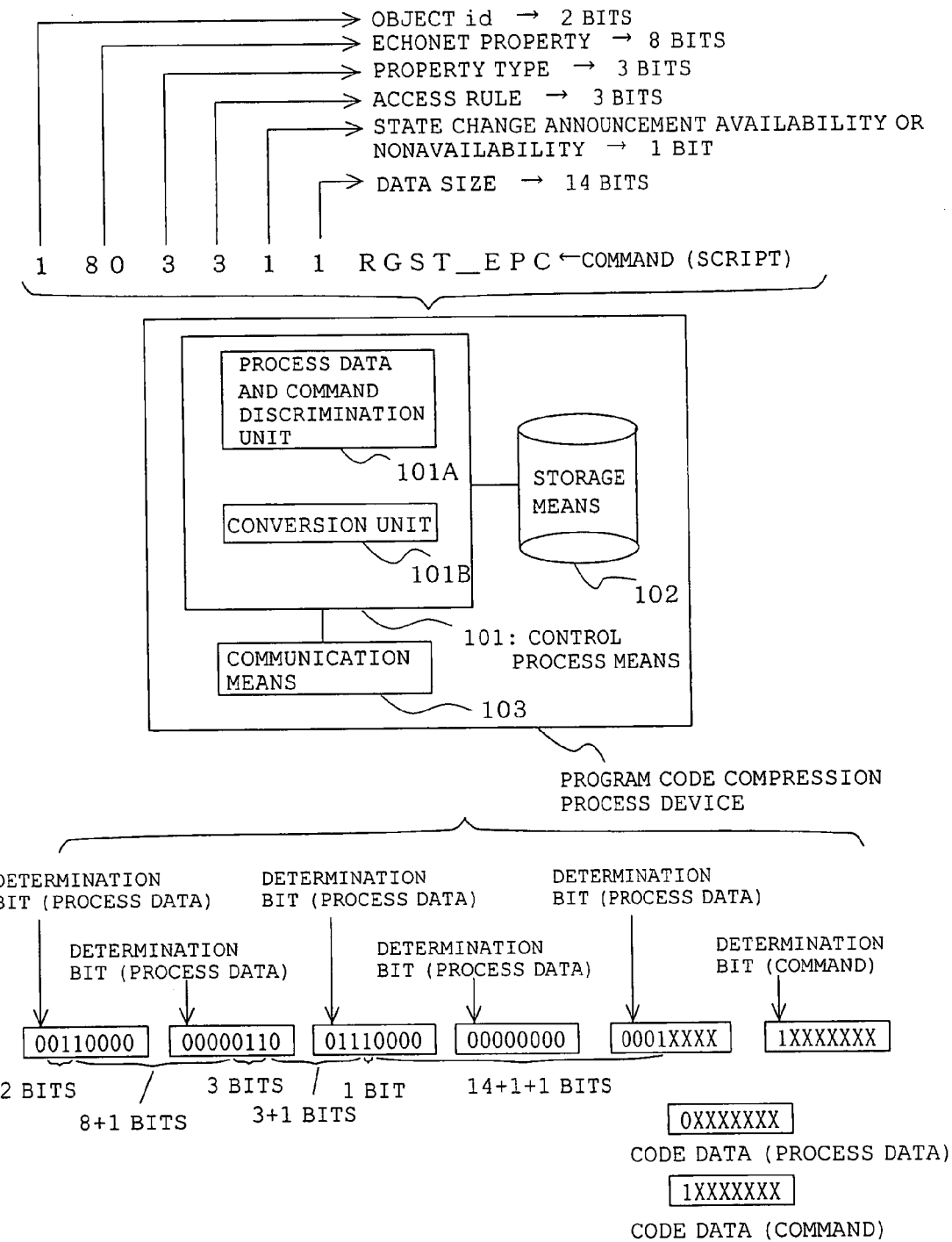
[FIG. 9] A diagram illustrating a program code compression process according to Embodiment 1.

FIG. 9 is a diagram illustrating a program code compression process according to Embodiment 3 of the present invention. An upper part of FIG. 9 illustrates an example of the execution code. Here, it is described as text data. The program code is composed of one or a plurality of execution codes. First, the execution code will be described. According to this embodiment as well, Forth is used as a language used for the program code, which is a code for performing the execution process in the ECHONET standard. According to this embodiment, storage means 102 as will be described later stores a dictionary.

As described in Embodiment 1 too, command RGST_EPC is described for executing and processing a registration for property information of the incorporating apparatus. Object id is an id added to an object of the incorporating apparatus. 2 bits are allocated to represent object id. ECHONET property is a code of a property that can be set in accordance with a type of the incorporating apparatus (for example, an air volume setting state in an air conditioner or the like). A value of the code is defined by the ECHONET standard, and 8 bits are allocated. Also, herein, 7 types are prepared as property data type, and 3 bits are allocated. Access rule represents write (Set), read (Get) and allowance or disallowance of notification, and 3 bits are allocated. State change announcement availability or nonavailability is an index (flag) indicating whether or not, a notification is issued via the network when a state of the property is changed, and 1 bit is allocated. Data size is for defining a data size of the property, the maximum value is set as 8640 bytes in the ECHONET standard, and 14 bits are allocated to represent the numeral value.

Next, a description will be given of a configuration and a process of the program code compression process device. The program code compression device according to this embodiment is composed of control process means 101, the storage means 102, and the communication means 103. The control process means 101 includes a process data and command discrimination unit 101A and a conversion unit 101B. In the control process means 101, with the process data and command discrimination unit 101A, each of the execution codes of the program code is collated with the dictionary stored in the storage means 102 to set character strings, numerals, and the like, which do not match the dictionary, as the process data and to set the matching character strings (scripts) as the command, thus performing discrimination process between the process data and the command. At this time, for example, on the basis of an instruction, data, and the like, which are input by the operator from the input means, the execution code may be generated by the program code generation unit (not shown in the drawing) provided in a prior stage of the process data and command discrimination unit 101A of the control process means 101 or may be generated in another device and the execution code contained in a signal that is sent via a communication circuit (not necessarily related to ECHONET) may be processed.

The conversion unit 101B makes the process data and the command expressed in data of a binary format (hereinafter referred to as the binary data) and generates data being divided in a predetermined data amount. In this embodiment, 7 bits are set as the predetermined data amount. For example, when the process data has data amount that cannot be divided by 7, for example, "0" is replenished for the rest of the bits. Then, for data representing the process data (hereinafter this data is also referred to as process data), "0" is added as an initial bit to the divided bits, and for data for determining the command (hereinafter this data is also referred to as command), "1" is added. That is, this becomes a determination bit (flag) for determining whether this is the process data or the command. As a result, as shown in the lower part of FIG. 9, each of the execution codes (the program code) is divided into byte code in unit of 1 byte (8 bits). In this way, pieces of the process data divided into the character string of each item (element) are compiled as the binary data and an encode process is performed thereon to realize the reduction in the data amount.

On the other hand, the command is represented by the binary data corresponding to the command with a 1 to 1 correspondence. As a result, the command represented by the binary data can be determined. A relation between this command and the binary data are associated with each other and stored as data in the storage means 102, and the conversion unit 101B refers to the data at the time of the generation. Herein, if the number of commands is equal to or smaller than 128, 1 byte is enough to determine the command. For example, in a case where the number of commands is equal to or larger than that or the like, 2 or larger bytes are necessary.

However, even in such a case, if it becomes possible to determine the command frequently used for (appearing in) the execution process (for example, related to the property, etc.) by way of only 1 byte code data, the data amount of the entire program code can be further reduced. It should be noted that the code data in the byte unit which is generated through the method according to this embodiment may be further compressed through a known bit sequence compression method such as a run length method.

The compressed program code which is generated in the above-described manner is stored in program code storage means 124 of the incorporating apparatus according to Embodiment 4 as will be described via the communication means 103 or a wired or wireless communication circuit, for example, in response to a download request sent from the incorporating apparatus side via the network or by way of an active distribution from the program code compression process device (the control process means 101) side.

As described above, according to Embodiment 3, the process data and the command are discriminated from each other in each of the execution codes to divide the respective data into a predetermined unit (7 bits, according to this embodiment), such that pieces of the process data are compiled in terms of each element (item) into the binary data and for the commands, corresponding numeral numbers are set as the binary data, and the determination bit for determining whether the data contains the process data or the command is added to each data so as to divide the data into 1 byte data, whereby both the process data and the commands can be compressed. Then, at the time of performing the execution process, read is performed for every byte, and it is possible to easily determine whether the data includes the process data or the command. Also, as the program code is set with use of a language based on the reverse Polish notation such as Forth, the execution code is composed in the order of the process data and the command, whereby it is possible to discriminate between the process data and the command easily. Furthermore, by setting a unit for diving the program code as 1 byte, for example, such a processing device as one-chip micro computer can cope with performing the execution process. Then, for example, by performing an adjustment in accordance with the frequency such as lowering the number of bytes containing a command frequently used (appearing) in the execution process, it is possible to further improve the compression effect.

Embodiment 4

Figure 10:
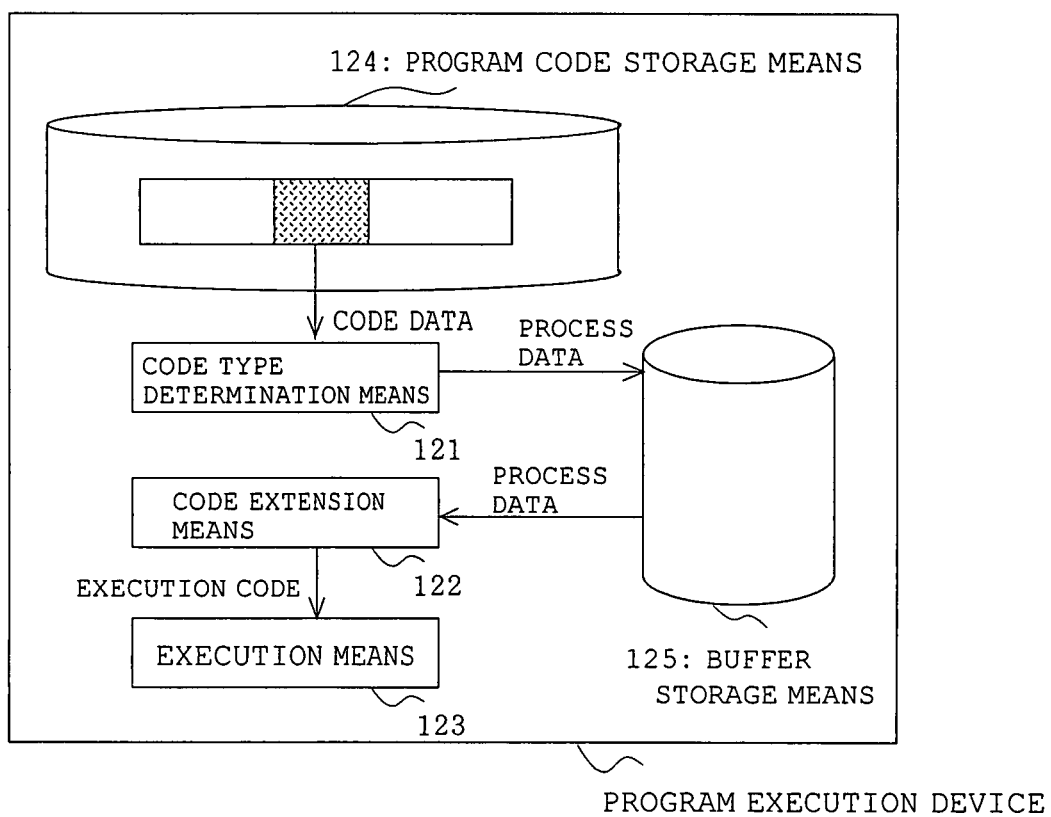
[FIG. 10] A diagram illustrating a program execution device according to Embodiment 2 of the present invention.

FIG. 10 is a drawing illustrating a program execution device according to Embodiment 4 of the present invention. In this embodiment, the program execution device is composed of code type determination means 121, code extension means 122, execution means 123, program code storage means 124, and buffer storage means 125. Then, the execution process based on the compressed program code which is generated in Embodiment 3 is performed.

The code type determination means 121 reads (inputs) the compressed (encoded) program code stored in the program code storage means 124 in a predetermined data amount. According to this embodiment, in conformity with Embodiment 3, the predetermined data amount is set as 1 byte (8 bits). Then, it is determined whether the read data is data containing the process data (data byte. Data which does not contain any commands) or data containing a command (command byte). The code type determination means 121 performs the determination on the basis of the determination bit (flag) described in Embodiment 3. Then, when it is determined as the process data, the process data is stored in the buffer storage means 125, and when it is determined as the command, the control of the process is passed over to the code extension means 122.

When the code type determination means 121 determines the data as the command, the code extension means 122 generates (extends, decodes) the execution code on the basis of the process data stored in the buffer storage means 125 and the command. When the execution code is generated, the control of the process is passed over to the execution means 123.

The execution means 123 performs the execution process on the basis of the execution code generated by the code extension means 122. At this time, according to this embodiment, the execution means 123 is an interpreter for performing the execution process of the command with respect to the process data while analyzing (translating) the execution code. Therefore, the program code is sequentially executed and processed for each execution code. At this time, the execution means 123 has the dictionary described in Embodiment 3 in the storage means (not shown in the drawing) in order to analyze the execution code. When the execution process is ended, the control of the process is passed over to the code type determination means 121.

The program code storage means 124 and the buffer storage means 125 are both storage means. At this time, according to this embodiment, the program code storage means 124 is a non-volatile memory, but is not merely an ROM, and is storage means (for example, an EPROM, an EEPROM, or the like) in which rewrite of the program code can be performed by way of addition, partial or entire change, deletion, etc. In a case of rewriting the program code, as has been described in Embodiment 1, for example, through the download via the network, the signal containing the program code is received by the communication means (not shown in the drawing) which the incorporating apparatus has, and stored and held in the program code storage means 124.

The buffer storage means 125 is, for example, a volatile memory. The buffer storage means 125 is temporal storage means for storing at least the process data until the code extension means 122 generates the execution code, and none is left if the next process data is input. Therefore, the storage capacity which the buffer storage means 125 has is arbitrary, but preferably, is set as a maximum storage capacity that is necessary for storing the process data part (or the execution code) of the execution code executed and processed by the incorporating apparatus (the program execution device) for one time.

According to this embodiment, the data of the compressed program code to be executed and processed is read for one byte each, and the determination as to whether the data contained therein is the process data or the command is performed. In the case of the process data, the data is stored in the buffer storage means 125, and when it is determined as the command, extension means 122 puts the process data stored in the buffer storage means 125 and the command into the execution code. The execution means 123 executes and processes the execution code. As a result, on the basis of the program code held in the program code storage means 124 by the program execution device, the execution process for each execution code is preformed. At this time, the execution code (the program code) having been subjected to the execution process is not carelessly left in the buffer storage means 125 such as the RAM, and the storage capacity of the buffer storage means 125 is suppressed so as not to exceed the necessary amount for temporarily storing the process data of the execution code (or the execution code) necessary for the execution process for one time. Also, the code type determination means 121, the code extension means 122, and the execution means 123 may be respectively physically independent means, but in usual cases, the program execution device is composed of a computer such as so-called micro computer or the like, and these means are constituted, for example, by the CPU-based control processing device. Then, as the control processing device executes the processes of the respective means, the execution processes of the program execution device are realized.

FIG. 11 is a flowchart describing operations at a time when the execution process in the program execution device is performed. At this time, in particular, operations performed by the code type determination means 121, the code extension means 122, and the execution means 123 of the program execution device will be mainly described. The code type determination means 121 reads the data of the compressed program code from the program code storage means 124 by unit of 1 byte (S1). Then, the code type determination means 121 performs a determination as to whether or not the read data is the command or the process data (not the command) on the basis of the determination bit described in Embodiment 1 being "0" or "1" (S2). When it is determined as the process data (not the command), the data is stored the buffer storage means 125 while the determination bit is removed therefrom (S3), and the further compressed data of the program code is read by unit of 1 byte (S1).

On the other hand, when it is determined that the read data is the command, the control is passed over to the code extension means 122. The code extension means 122 discriminates the command represented by the data on the basis of the read data (the binary data) to convert the data into a command in a script format. The relation between the binary data and the command described in Embodiment 1 is used for this discrimination. After the command is discriminated, the element (item) of the process data executed and processed by the command and the allocated data amount (the number of bits) are found out, whereby on the basis of the binary data of the process data, dividing the process data for each element (item) is performed. The above-described extension process is performed, whereby the execution code is generated (S4).

Then, when the control is passed over from the code extension means 122 to the execution means 123, the execution process is performed on the basis of the execution code generated by the code extension means 122 (S5). In the language based on the reverse Polish notation, each element (item) is piled in stack and processed on the basis of the command. When the execution process based on the execution code is ended, the control is passed over to the code type determination means 121, and a process is performed for the next execution process based on the execution code. As described above, the execution process for each execution code is sequentially performed to execute and process the program code, and the incorporating apparatus is operated. Also, the signal containing the data based on the execution process is sent to an apparatus other than the incorporating apparatus via the network for the operation.

As described above, according to Embodiment 4, the compressed data of the program code is read by a predetermined data amount (1 byte according to this embodiment) from the program code storage means 124. When the code type determination means 121 determines the read data as the data containing the process data, the process data is temporarily stored in the buffer storage means 125. When it is determined as the data containing the command, the code extension means 122 subsequently generates the execution code, and the execution means 123 performs the execution process based on the execution code. Thus, it suffices that the buffer storage means 125 merely stores the process data until the execution code is generated, and as a result, the storage capacity provided as the buffer storage means 125 can be reduced. In addition, as the entire process in the program execution device from the read of the compressed data of the program code to the execution process of the execution code is simple, it is possible to avoid the decrease in the speed even the thus generated execution code (the program code) is not kept. As described above, the program execution device according to this embodiment realizes a good balance between the reduction in the storage capacity related to the process and the maintenance of the execution process speed, and an effect is particularly attained in the case when the program execution device is incorporated in a household electrical appliance which highly requires cost suppression for the operation control. In addition, the signal containing the compressed data of the program code is sent via the communication circuit to the incorporating apparatus or the like so that the data of the program code storage means 124 can be rewritten, whereby it is possible to keep the program code of the program code storage means 124 up to date more efficiently in a sophisticated state.

Embodiment 5

FIG. 12 is a drawing illustrating a data configuration of the compressed execution code according to Embodiment 5 of the present invention. According to Embodiment 1 described above, the process data put into the binary data is divided into 7 bits each from the heading (so called left-alignment in the represented data sequence), and if the process data is not divided by 7, the remaining bit is replenished with "0" or the like.

At this time, when the execution process based on the execution code is performed, in a case of adopting a data configuration such as stack, the data piled at the last becomes the heading, and the process is performed from the data (that is, the process from the data on the right hand side in the represented data sequence). For example, when the number of elements (items) can be changed, data of this number is indicated at the heading of the stack. From such a point, unification in the same process system may be advantageous. In view of the above, as shown in FIG. 12(*a*), the binary data is set as so-called right-alignment, and in the extension process in the code extension means 122 as well, the heading becomes a part of the process data (not the replenished data).

In addition, as in FIG. 12(*b*), as the data indicating the number of bytes of the data which does not contain commands is included in the data of 1 byte (data which does not contain commands) to be read at first, it is possible to determine whether or not the data contains the command in the code type determination means 121. In FIG. 12(*b*), 5 bits (numeral values from 0 to 31) are allocated to data indicating the number of bytes of the process data. As a result, it is unnecessary to provide the determination bit for each byte data. For that reason, in particular, as the number of bytes (the number of bits) of the data containing the process data is larger, more efficient compression can be performed. Furthermore, the number of bytes of the process data is found out and the command subsequently follows the process data, and therefore it is unnecessary to provide the determination bit for the command. As a result, as compared with the case of providing the determination bit, for example, the number of commands that can be discriminated by 1 byte is doubled. For that reason, it is also effective in the case where the number of commands is large.

Embodiment 6

According to the above-described embodiments, the program code is described in the language based on the reverse Polish notation, and the execution means 123 is the interpreter for analyzing the description to perform the execution process. The present invention is not limited to this. For example, the interpreter may be composed of JavaVM (or JVM (Java and Java Virtual Machine JVM are brand names or registered trademark of Sun Microsystems, Inc. in the United States of America and other countries) or the like, for performing the execution process based on the execution code in the stack type language, as a process system. As being applicable to more general language, there is a possibility that a further sophisticated code generation can be performed.

The invention claimed is:

1. A program execution device comprising:
   first storage means for storing data obtained by compressing a program code constituted by an execution code that is composed of process data used for an execution process and a command representing the execution process which are arranged in order;
   second storage means for temporarily storing the process data;
   type determination means for reading the data obtained by compressing the program code from the first storage means by a predetermined data amount each to determine whether or not the data contains the command, and storing the process data in the data in the second storage means when it is determined that the data does not contain the command;
   code extension means for generating an execution code on the basis of the process data stored in the second storage means and the command when the type determination means determines that the data contains the command; and
   execution means for sequentially performing the execution process of the program code on the basis of the execution code generated by the code extension means,
   wherein the process data is piled in a stack, and the execution means performs the execution process on the basis of the program code described in a stack type language for the command to act on the stack to perform the execution process.

2. The program execution device according to claim 1, wherein the execution means performs the execution process based on the program code described in a language based on a reverse Polish notation.

3. The program execution device according to claim 1, wherein the predetermined data amount is set as 1 byte.

4. The program execution device according to claim 1, wherein 1 bit of the predetermined data amount is data of a flag for the determination means to determine whether or not the data is code data containing the command.

5. The program execution device according to claim 1, wherein data representing the number of data which does not contain the command is included in data of the predetermined data amount to be read first, and the type determination means determines the data of the predetermined data amount which is read for the number of data which does not contain the command as the data which does not contain the command, stores the process data in those pieces of data in the second storage means, and sets data of the predetermined data amount to be read next as the data containing the command.

6. The program execution device according to claim 1, wherein the number of the data containing the command is set for each command on the basis of a frequency in which the command is used.

7. The program execution device according to claim 1, wherein the first storage means stores data obtained by compressing the program code included in a signal that is sent via the communication circuit.

8. A program execution method comprising:

reading data obtained by compressing a program code which is constituted by an execution code that is composed of process data used for an execution process and a command representing an execution process content which are arranged in order, from a first storage means by a predetermined amount of data each;

determining, by type determination means, whether or not the read data contains the command;

storing the process data in a second storage means in response to determining that the data does not contain the command and the read data contains the process data, and generating by code extension means an execution code on the basis of the process data stored in the second storage means and the command when it is determined that the data contains the command; and sequentially performing an execution process of the program code by execution means on the basis of the execution code generated by the code extension means, wherein the process data is piled in a stack, and the execution process is performed on the basis of the program code described in a stack type language for the command to act on the stack to perform the execution process.

* * * * *